United States Patent [19]
Neff

[11] 4,036,189
[45] July 19, 1977

[54] COLLECTION AND FEEDING OF INSECTS TO ANIMALS

[76] Inventor: Gregor N. Neff, 85 Myrtle Ave., Dobbs Ferry, N.Y. 10522

[21] Appl. No.: 656,890

[22] Filed: Feb. 10, 1976

Related U.S. Application Data

[60] Division of Ser. No. 497,540, Aug. 14, 1974, Pat. No. 3,951,104, which is a continuation-in-part of Ser. No. 477,839, June 10, 1974, abandoned, and Ser. No. 460,619, April 12, 1974, Pat. No. 3,939,802, which is a continuation-in-part of Ser. No. 213,966, Dec. 30, 1971, abandoned.

[51] Int. Cl.² ............................................. A01K 61/02
[52] U.S. Cl. .................................................. 119/51 R
[58] Field of Search .................. 119/3, 51 R; 43/113, 43/65

[56] References Cited

U.S. PATENT DOCUMENTS

| | | | |
|---|---|---|---|
| 2,883,790 | 4/1959 | Blackman | 43/113 |
| 3,123,933 | 3/1964 | Roche | 43/113 X |
| 3,337,982 | 8/1967 | Sajulan | 43/65 |
| 3,465,468 | 9/1969 | Takamoto | 43/113 |

*Primary Examiner*—Hugh R. Chamblee
*Attorney, Agent, or Firm*—Curtis, Morris & Safford

[57] ABSTRACT

Use is made of the discovery that "near" ultra-violet radiation is effective in attracting large enough quantities of insects entirely from within the water to feed substantial numbers of animals without attracting flying insects from the air. Radiation from lamps producing predominantly near ultra-violet radiation, that is, radiation whose wavelength is between 3,000 and 4,000 angstroms, is directed into water in which insects live. The insects which are attracted by the radiation are fed to the animals. Preferably, the insects are attracted towards an insect enclosure with a downwardly-facing entrance in the water. A near ultra-violet lamp in the enclosure attracts the insects into the enclosure, from which they cannot escape into the air above the water. Fish or frogs in a cage are positioned below the enclosure to eat insects in or rising towards the enclosure. In one embodiment, only the lamp is used; the insects are numerous enough to allow some to escape and still feed substantial numbers of animals. It is preferred that the animals be concentrated in the cage at a density near that at which they are too crowded to grow properly. It is believed that the fish or other animals will catch most of the insects before they escape into the air. In another embodiment, the enclosure forms an airspace above the water, and a fan is used to draw the insects out of the enclosure and be collected for feeding land-based animals. Also disclosed is a system and method for grading or separating aquatic animals as to size without taking the animals out of the water. Two enclosures, such as two fish or frog cages, are separated by a wall with grading openings so that smaller animals can swim through the openings but large ones cannot. Means are provided for attracting the fish towards the enclosure into which it is desired for the smaller fish to go.

23 Claims, 8 Drawing Figures

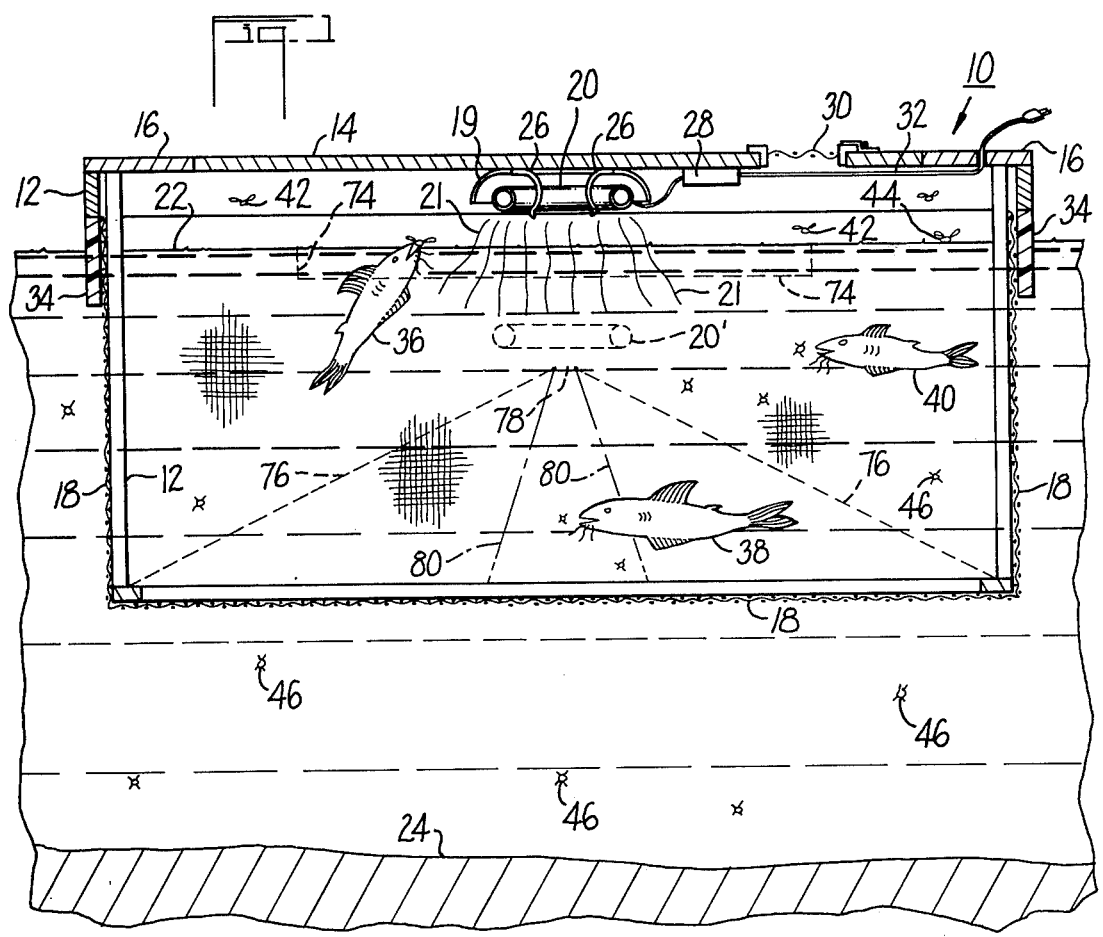
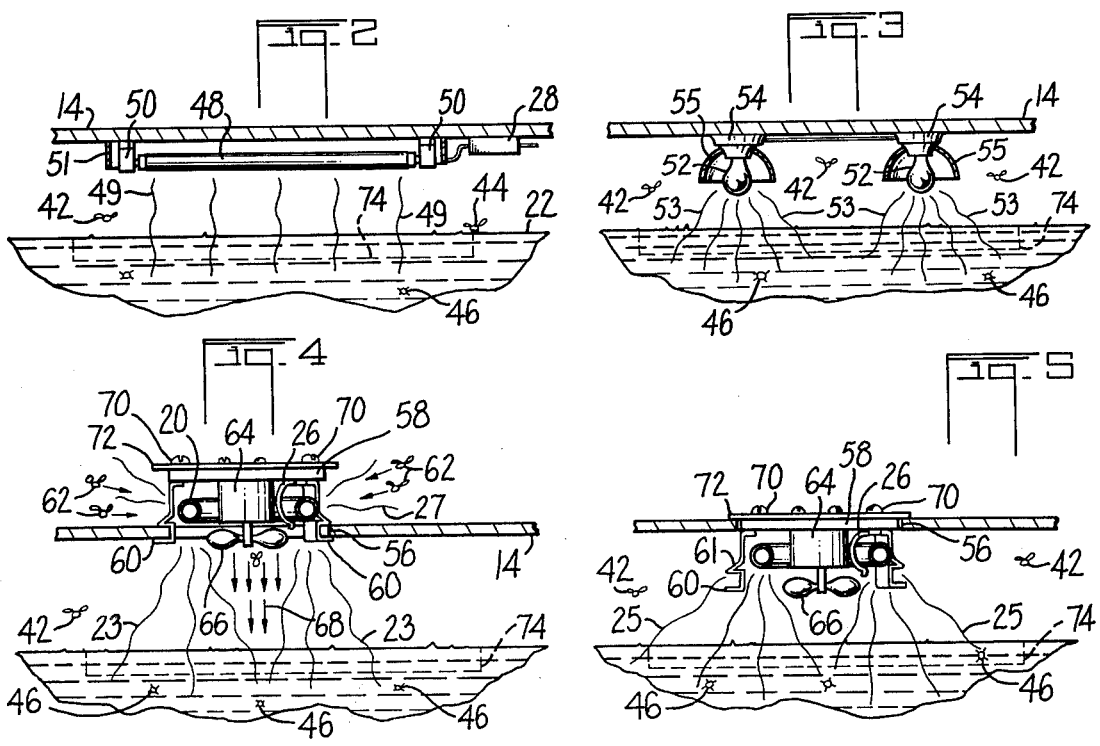

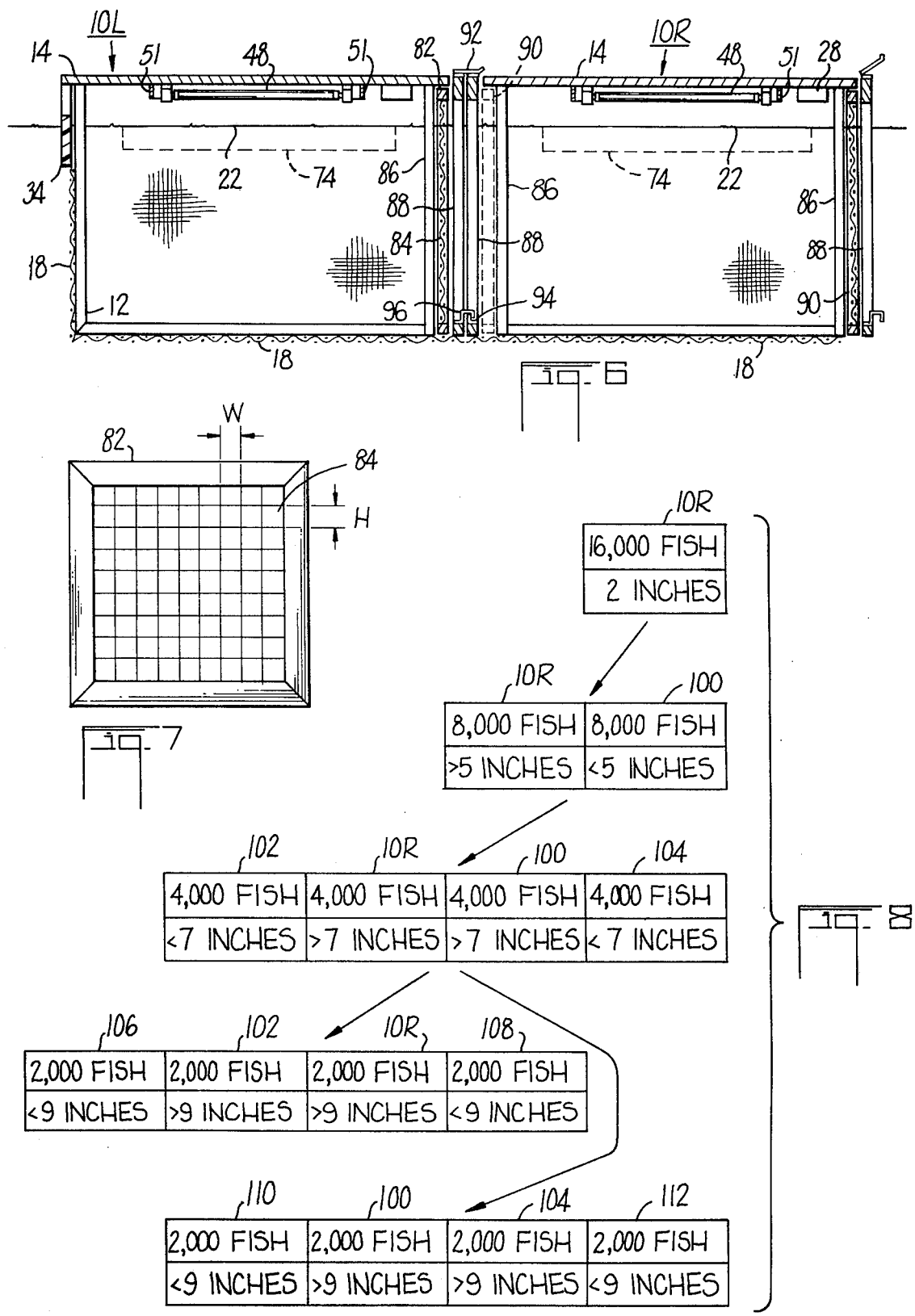

COLLECTION AND FEEDING OF INSECTS TO ANIMALS

This invention relates to the feeding of animals, preferably aquatic animals, and involves the feeding of insects to such animals. This application is a division of application Ser. No. 497,540, filed Aug. 14, 1974, now U.S. Pat. No. 3,951,104, which is a continuation-in-part of my U.S. patent applications Ser. No. 460,619, filed on Apr. 12, 1974, now U.S. Pat. No. 3,939,802, which is a continuation-in-part of U.S. patent application Ser. No. 213,966, filed Dec. 30, 1971, now abandoned; and Ser. No. 477,839, filed on June 10, 1974, now abandoned. The disclosures of said patent applications hereby are incorporated herein by reference.

My prior applications describe apparatus and methods for collecting and feeding insects to animals, primarily by means of traps using "black light" lamps and fans or other means for trapping or incapacitating the insects from the air. Fish in cages in the water are fed insects from such traps.

Applicant has made several discoveries upon which this invention is based. First, applicant has discovered, contrary to prior teachings in the prior art, that, in devices such as those shown in his prior patent applications in which black light shines directly into the water in cages containing fish to be fed, apparently far more aquatic insects are attracted into the fish cages from the water below the light than are attracted from the air. Secondly, also contrary to the teachings of the prior art, applicant has recognized that "near" ultra-violet radiation, otherwise known as black light, actually does penetrate the water well. Thirdly, again contrary to prior art teachings, applicant has recognized that insects cannot detect much radiation other than ultra-violet radiation.

The main object of this invention is to make use of the foregoing discoveries in the efficient and simple feeding of insects to animals.

In the confined culture of aquatic animals, one of the problems lies in the sorting of the animals; that is, in separating the animals according to size. With both fish and frogs, for example, it often is important to sort the animals so as to grow only animals of about the same size in the same enclosure. This minimizes hogging of the food by larger animals, and minimizes cannibalism. Sorting also allows earlier marketing of the faster growing animals. However, sorting has been a laborious, costly process which often is traumatic for the animals.

It is another object of the invention to provide a simpler, less laborious, less traumatic method and apparatus for sorting aquatic animals and for growing the animals in separate groups in which the animals are more nearly uniform in size.

In accordance with the present invention, radiation from lamps producing predominantly near ultra-violet radiation, that is, radiation whose wavelength is between 3,000 and 4,000 angstroms, is directed into water in which insects live. The insects which are attracted by the radiation are fed to the animals. Preferably, the insects are attracted towards an insect enclosure with a downwardly-facing entrance in the water. A near ultra-violet lamp in the enclosure attracts the insects into the enclosure, from which they cannot escape into the air above the water. Fish or frogs in a cage are positioned below the enclosure to eat insects in or rising towards the enclosure. In one embodiment, only the lamp is used; the insects are numerous enough to allow some to escape and still feed substantial numbers of animals. It is preferred that the animals be concentrated in the cage at a density near that at which they are too crowded to grow properly. It is believed that the animals will catch most of the insects before they escape into the air. In another embodiment, the enclosure forms an airspace above the water, and a fan is used to draw the insects out of the enclosure and be collected for feeding land-based animals. Also disclosed is a system and method for grading or separating aquatic animals as to size without taking the animals out of the water. Two enclosures, such as two fish or frog cages, are separated by a wall with grading openings so that smaller animals can swim through the openings but large ones cannot. Means are provided for attracting the fish towards the enclosure into which it is desired for the smaller fish to go.

Other objects and advantages will be set forth in or apparent from the following description and drawings.

In the drawings:

FIG. 1 is a cross-sectional view of one embodiment of the invention;

FIGS. 2, 3 and 4 are fragmentary cross-sectional views of further embodiments of the invention;

FIG. 5 shows the embodiment of FIG. 4, but in a different operative condition;

FIG. 6 is a cross-sectional view illustrating the sorting method and apparatus of the invention;

FIG. 7 is an elevation view of a component from the FIG. 6 apparatus; and

FIG. 8 is a schematic diagram illustrating a method of raising aquatic animals in cages in accordance with with the invention.

FIG. 1 shows a preferred fish-rearing cage 10 floating on the surface 22 of a body of water. The bottom 24 of the body of water also appears in FIG. 1. The cage includes a frame 12 covered by mesh 18, a hinged opaque wooden top 14 with a hinged, screened observation window 30, and top side-boards 16.

Flotation material 34 is wrapped around the outside of the cage in abutment with the frame member 12 just above it so as to form an airspace above the water which is enclosed so as to prevent insects from escaping.

Fish such as channel catfish (ictalurus punctatus) 36, 38 and 40 are housed in the cage 10.

A circular blacklight fluorescent lamp bulp 20 is mounted on the underside of the cover 14 by means of three spring brackets 26. A ballast and starter are enclosed in a water-proof housing 28, and an electric cord 32 is provided to supply electricity to the lamp 20, and to its starter and ballast. The lamp 20 is mounted parallel to the cover 14 and to the water surface 22, and is only a short distance (e.g., 6 to 18 inches) above the water, so as to maximize the radiation being directed into the water. A reflector 19 further concentrates and directs the radiation towards the water.

The bulb 20, when energized, produces radiation whose wavelength is predominantly in the near ultra-violet or black light range, from 3,000 to 4,000 Angstroms; preferably from 3,200 to 3,900 Angstroms. The principal prior art (Heidinger, 33 "Progressive Fish Culturist," page 191) teaches the use of white visible light from an incandescent lamp to attract aquatic insects, and states that ultra-violet is unsatisfactory for this purpose because it is absorbed by the first few centimeters of water. Applicant has recognized that, although radiation in the "far" ultra-violet range (3,000 to 2,000 Angstroms) and the "extreme" ultra-violet range (2,000 to 40 Angstroms) is completely absorbed by water of a few centimeters depth, water is almost as transparent to near ultra-violet radiation as it is to visible light. Furthermore, insects can sense little other than ultra-violet radiation. Therefore, radiation in the near ultra-violet range gives the combination of maximum penetration and maximum attraction of insects.

The bulb 20 most readily available on the market is the circular fluorescent blacklight bulb No. FC8T9/BL Rapid Start Blacklight Bulb, 8 inches diameter to the center of tube (12 inch diameter bulbs also are available). These bulbs are believed to emit some radiation at wavelengths below 3,000 Angstroms, possible as low as 2,800 Angstroms, and are known to emit substantial quantities of visible light, principally blue in color. The visible light is believed to be helpful, as described below. However, the radiation output of the lamp is peaked near 3,5000 Angstroms, and is predominantly in the near ultra-violet range of from 3,000 to 4,000 Angstroms.

In accordance with the present invention, the lamp 20 is not exposed to the air to attract flying insects. Also, the fan used in some of my prior insect catching devices has been eliminated.

It has been found that, at least in certain waters in which tests have been made, the insects attracted from within the water are sufficient to completely feed relatively large numbers of fish in the cage 10. It is believed that relatively large numbers of hatching aquatic insects hatch just before and just after nightfall, and, perhaps, just before daybreak. Most of these insects normally would escape from predators under cover of darkness. However, they are attracted to the lamp 20 (as they are to the lamps shown in my above-identified prior patent applications) and rise toward it. It is believed that the visible and, perhaps, ultra-violet light from lamp 20 enables the fish to see the insects better and eat them (as the fish 38 and 40 are doing) before they reach the water surface. However, some insects still avoid capture, reach the water surfaces, and fly into the air in the enclosed airspace above the water. The airborne insects are indicated by reference number 42. Eventually, the latter insects tire and fall into the water, or collide with it, where they are eaten by fish such as the fish 36 shown in FIG. 1.

The mesh 18 of the cage 10 has openings large enough to admit insects but small enough to contain fish 36, 38 and 40 in the cage. For example, a mesh size of ¼ inch by ¼ inch is small enough to contain channel catfish fingerlings as small as 2 inches long, but large enough to admit most, if not all, aquatic insects. A mesh size of ½ inch by 1 inch is adequate to contain 4 to 7 inch channel catfish fingerlings, etc.

From the foregoing, it can be seen that the upper portion of the cage 10 forms an insect enclosure with an entrance which faces downwardly towards the bottom 24 of the body of water. This also is true regarding most of the embodiments of the inventions shown in my above-identified patent applications; namely FIGS. 1 through 5 and 7 of applications Ser. Nos. 460,619 and 213,966; FIGS. 8, 9 and 11 through 14 of application Ser. No. 460,619; and FIGS. 1, 2, 3, 5, 6, 7, 9 and 10 of application Ser. No. 477,839.

In fact, the tests in which the discovery of the degree of aquatic insect attraction was made involved the use of cages and traps virtually the same as those shown in FIGS. 8 and 9 of application Ser. No. 460,619 in canals in South Florida, U.S.A. In the tests, channel catfish fingerlings were put in some cages and fed nothing but the insects attracted by the black light lamp and fan of the insect trap. Fish of the same sizes were stocked in identical cages in the same body of water without insect traps and were fed the usual rations of ordinary floating feed and supplements normally fed to catfish. At the same time, insect traps identical to those on the cages were placed on nearby land and supplied with bags to collect insects caught in the traps. (This is the way such traps normally are used.) The results were that the fish being fed only insects grew at the same rate as the fish being fed the ordinary floating feed; moreover, the fish being fed the ordinary feed grew at the rate which normally had been obtained under similar circumstances in the past with the same feed. At the same time, the insects were collected and removed from the bags of the land-based traps and weighed daily. The total weight of the insects thus collected in one trap over one period of time of about one month was between 8 and 9 pounds. During the same period the lowest weight gain for fish being fed insects only was 75 pounds. That cage had only one trap on it. When the stomachs of some of the test fish were opened only insects or insect remains were found. Thus, the conclusion has been reached that the vast majority of the insects came from within the water. This was unexpected.

Another unexpected advantage of feeding insects to the fish was found to be that they did not appear to need the vitamin and medicinal supplements usually fed to cage fish. Apparently, the insects provided the fish with natural resistance to disease and parasites, and provided a sufficiently abundant source of vitamins. In any event, losses of insect-fed fish have been relatively low, and diseases or parasites have not been a significant problem.

It is possible that the use of ultra-violet light shining into the water every night provided additional prophylaxis for the fish. If so, the placement of the light source closer to the water, as shown in FIG. 1 of the drawings herein, can be expected to improve this effect.

Another unexpected finding in the tests was that a single insect trap fed approximately 1000 fish in a 4 ft. by 4 ft. by 8 ft. cage as well as it did approximately 500 fish of smaller size in a 4 ft. by 4 ft. by 4 ft. cage. It is believed, in fact, that the maximum fish density was not reached, and that it will be beneficial to increase the density to a point near the limit beyond which the mere density tends to limit the growth rate of the fish. This is known for caged channel catfish to be roughly 2 pounds of fish per cubic foot of water at two inches average length, and 12 pounds per cubic foot of water at 16 inches average length. There is an approximately linear relationship between density and average length between the lengths of 2 and 16 inches.

According to another feature of the invention, it is believed that the use of an insect enclosure may be avoided by packing the fish in the cages at the high densities specified above. It is believed that the closely-packed fish will not allow many insects to escape into the air; most will be eaten before reaching the surface. The enclosure also may be avoidable if the insect supply is large enough to permit insects to escape.

Alternative embodiments of the invention are shown in FIGS. 2 and 3, each of which is a cross-sectional view of the lamp part of a cage like that shown in FIG. 1.

In the FIG. 2 embodiment, the circular lamp of FIG. 1 has been replaced by a linear fluorescent blacklight bulb 48 fitted into two sockets in a pair of mounting brackets 50 with a reflector 51. The bulb 48 extends longitudinally of the rectangular cage. The light from bulb 48 radiates downwardly towards the water as indicated by lines 49. The advantages of the linear bulb 48 over the circular bulb 20 are believed to be lower cost and better light distribution in elongated cages.

In the FIG. 3 embodiment, the circular lamp has been replaced by two substantially spherical incandescent blacklight bulbs 52 mounted in bases 54 (with reflectors 55) attached to the cover 14. Light radiates outwardly and downwardly as indicated by the lines 53. Although the incandescent bulbs 52 require more electrical energy than the fluorescent bulbs 20 and 48, they do not require starters or ballast and thus require lower capital outlay. One bulb 52 may be sufficient under certain circumstances.

The radiation produced by the bulbs 48 and 52 is the same as that produced by the bulb 20.

In another alternative embodiment of the invention, either of the lamps 20 and 50 can be immersed in the water to maximize the radiation available to attract insects. Of course, the lamps and their connections must be made waterproof, in the manner of all underwater lighting. The position of such a submerged lamp is shown at 20' in FIG. 1.

FIGS. 4 and 5 show a convertible insect feeder in which a lamp can be used with a fan to attract flying insects, or without a fan when the added attraction is not needed.

Referring first to FIG. 4, a circular blacklight bulb 20 is mounted on a circular cover plate 58 with an outer flange 72. A motor 64 with an attached fan blade 66 is attached to the cover 58 in the central opening of the bulb 20. The bulb 20 is releasably held onto the cover plate 58 by means of three spring brackets 26 like those shown in FIG. 1.

The cover plate 58 is supported above the cage cover 14 by three spring legs 60 which have a C-shaped bend which fits with the edge of a circular hole 56 in the cage cover 14 so that the legs 60 rest on the cover 14 and support the plate 58, the fan and lamp above the cover 14. In this position, the lamp 20 attracts flying insects 62 which are drawn downwardly into the cage by the suction of the fan. The air downdraft created by the fan is indicated at 68. The radiation of the light is indicated by lines 23. It is believed that insects are attracted into the cage both from the air above and from the water beneath the cover 14.

In the condition shown in FIG. 5, the insect feeder of FIG. 4 has been lowered down into the hole 56 by depressing the spring legs 60 inwardly towards the lamp 20 until they clear the edge of the hole 56, and then lowering the feeder. The plate 58 is slightly smaller than the hole 56. The flange 72 rests on the top of the cover 14. The bend in the spring legs 60 is shaped so that, when the feeder is raised again, a sloping portion 61 hits the lower edge of the hole 56 and this depresses the legs to allow the feeder to pass through the hole until the legs snap into the position shown in FIG. 4.

When the feeder is used in the FIG. 5 position, the fan is turned off by means of a switch (not shown) and the lamp is hidden from airborne insects. More light shines into the water because the lamp 20 is closer to the water, and the power required to drive the fan is saved.

Preferably, the plate 58 is the circular wooden cutout formed when the hole 56 is cut in the cover 14.

The feeder shown in FIGS. 4 and 5 not only is convertible, but also is relatively inexpensive to build, since the cowling and other parts of the commercial insect traps used previously have been eliminated.

FIGS. 1 through 5 also show a mesh frog support platform 74 in dashed outline. The platform 74 can be used by frogs to sit on while feeding. The mesh size of the platform is large enough to allow rising insects to pass through, but small enough and deep enough to support the frogs in about one-half inch of water. Since frogs will eat only live or moving insects, the invention embodiment shown in FIG. 4 is preferred for use with frogs. The fan and lamp combination is believed to be capable of producing more live insects for the frogs.

It is believed that the near ultra-violet radiation from the bulbs 20, 48 or 52 will not injure the frogs on the platform 74; in fact, it may have a prophylactic effect on them. If it does injure the frogs, a circumferential platform around the inside of the cage can be used instead of the central platform directly beneath the lamp; in the latter case the cage preferably is cylindrical.

The circular fluorescent blacklight bulb 20 actually used in tests was an 8 inch diameter (8½ inch outside diameter) bulb No. FC8T9/BL sold by the General Electric Co.

The linear bulb 48 is a 24 inch blacklight bulb, also sold by General Electric Co. A longer bulb can be used if desired.

The incandescent bulbs also are sold by G.E. and are rated at 100 watts each.

An aquatic animal trap is an optional feature of the cage 10 of FIG. 1. The animal trap is composed of screened bottom walls 76 or 80 forming V-shaped entrance funnel with flat walls culminating in an entrance opening 78. The opening 78 is large enough to allow small forage animals to enter, but not large enough to allow caged animals to escape, as it is explained in detail in application Ser. No. 477,839.

The walls 76 or 80, together with screened walls 18, also form a device for gathering aquatic insects. The mesh size of the walls and the opening 78 are made small enough to contain insects (e.g., the mesh size of house screen). The insects rise from the water towards the bulb 20 or 48 or 52 and are funneled into the cage through the opening 78. This provides means for testing the effectiveness of various different insect attractors, the relative insect productivity of different bodies of water, etc.

The above gathering device can be used with a fan for blowing insects through a conduit leading away from the insect enclosure to a collecting depot where the insects are collected for feeding to land animals. This operation is the reverse of that shown in FIGS. 12, 13, 15, 16 and 17 of application Ser. No. 460,619.

FIGS. 6 and 7 illustrate the method and apparatus for sorting aquatic animals in accordance with the present invention. Two cages 10L and 10R are shown attached end-to-end. Each cage is constructed as shown in FIG. 2, except for the end which is attached to the other cage, and the right end of each cage 10R, each of which is constructed as shown in FIG. 5 of application Ser. No. 477,839. The hinged top 14 extends the entire length of the cage.

The attachment end of each cage (both ends of cage 10R) has a vertical slot formed by vertical guides 86 and end members 88. In the slot for the cage 10L on the left in FIG. 6 is a grading barrier 82 with a mesh 84 forming openings of a height H and width W (see FIG. 7) such that the barrier 82 prevents large animals from leaving the left cage, but allows small animals to move into the cage 10R on the right. The more usual grader bars can be used in place of the mesh 84, if desired.

The procedure for sorting is as follows. Normally the two cages 10L and 10R are separate, and each has a sliding partition such as the partition 90 shown in dashed outline in FIG. 6 closing the end of the cage. The mesh covering the partition 90 has openings small enough to retain all animals in the cages. When it is desired to sort aquatic animals such as fish or frogs in the left cage 10L, the two cages 10L and 10R are joined as shown in FIG. 6. A pair of lower catches 94 and 96 and a toggle-type latch 92 at the top hold the cages together. Then the cover 14 of the cage 10L is raised and the partition is removed and replaced with the grading barrier 82. Then the cover of cage 10R is lifted and the left partition 90 is removed from that cage, so that the only barrier to travel from cage 10L to cage 10R is the grading barrier 82, as it is shown in FIG. 6.

Next, the lamp 48 is turned on at feeding time in cage 10R, but is left off in cage 10L. Alternatively, or in addition, floating fish food can be spread on the water to attract fish from cage 10L to cage 10R. If the attraction of food in cage 10R is not enough to cause the animals to swim through the barrier, a screened "pusher" panel of the same width as the inside of the cage 10L can be inserted at the left end of cage 10L and pushed to the right to urge animals through the barrier 82. In any event, means are used to attract or urge aquatic animals from cage 10L to cage 10R. Of course, only the smaller animals can get through the barrier 82. This leaves the larger animals in cage 10L and the smaller ones in cage 10R, and the sorting has been accomplished The regular partitions 90 then can be inserted and the cages separated again, if desired, so that the large and small animals can continue to grow separately.

If one of the cages 10L or 10R is empty at the time of grading, the method can be simplified by locating a grading barrier 82 in place of the usual end partition in the empty cage prior to joining the cages. Then all that need be done is remove the end partition of the other cage after joining the cages.

In a preferred growing method, fish or frogs are located into cages at a high density near the upper limits described above, at a small size. Then the animals are sorted and separated into groups of more nearly uniform size at moderately frequent time intervals 1 or 2 months, e.g.) by the above grading procedures. This maximizes utilization of the cages and other equipment and minimizes capital costs. It also reduces deprivation of food to smaller animals due to hogging of food by larger animals, and, in the case of frogs, trout and other cannibalistic animals, will reduce cannibalism to a minimum. The fish or frogs need not be removed from the water during any sorting, and the sorting operation involves a minimum of trauma on the fish or frogs FIG. 8 shows an alternative manner of using the methods and apparatus described above. Instead of separating two cages after part of the contents of one have been sorted into the other, the grader barrier 82 can be replaced by an ordinary partition 90, and the cages can remain attached while the animals grow, if the insect supply of insects in the vicinity of the two joined cages remains adequate to feed all the animals.

The cage 10R first is loaded with small fish at a relatively high density. For example, 16,000 2 inch long channel catfish fingerlings are loaded into the cage 10R, whose dimensions are 4 feet deep, 4 feet wide and 8 feet long.

After about 2 months growth, the average size of the fish will approach 5 inches, which is approaching overloading of the cage. At that time, another cage 100 identical to cage 10R is attached as shown in the second portion of FIG. 8. The fish are sorted as described above, so that the larger fish remain in the first cage 10R, and the smaller fish in cage 100. The partition 90 is used to replace the grading barrier 82, and the 8,000 fish in each cage are allowed to grow until they reach 7 inches in average length, at which point they are approaching overcrowding. At this time, additional cages 102 and 104 are attached, respectively, to cages 10R and 100 as shown, and the fish are sorted as described above, with cages 102 and 104 being attached to the free ends of cages 10R and 100. Thus, the partition structure at both ends of each cage is used. It should be noted that the flotation material 34 on each cage with partitions at both ends can be concentrated at the sides of the cage so that it will not interfere with the partitions.

When 4,000 fish (less the usual casualties) reach an average length of 9 inches, they again are approaching overcrowding, and so the cages 10R and 100 are separated, and empty cages 106 and 108 are attached to the ends of one remaining pair 102 and 10R of cages, and empty cages 110 and 112 similarly are attached to cages 100 and 104. Sorting is repeated, leaving 2,000 fish in each cage to grow to maturity. However, the various stages of growth are reached at different times, so that the largest, fastestgrowing fish have been concentrated in cage 10R. It is possible, therefore, to harvest the fish in cage 10R earlier than the fish in cages with smaller fish.

The number of fish in each cage can be reduced further from 2,000 to 1,500 or 1,600 (depending on mortality) by early harvest of the largest fish from the cages 106, 102, 10R, etc. by the sorting techniques described above.

The advantages of such methods, namely, maximizing use of cages and equipment, uniformity of size of harvested animals, etc., are available because the sorting of the animals is not highly laborious, and is not very traumatic for the animals.

The above description of the invention is intended to be illustrative and not limiting. Various changes or modifications in the embodiments described may occur to those skilled in the art and these can be made without departing from the spirit or scope of the invention.

I claim:

1. A method of feeding aquatic animals, said method comprising attracting insects from within a body of water by directing into said water electromagnetic energy consisting predominantly of energy having a wavelength in the range of 3,000 Angstroms to 4,000 Angstroms, and feeding said insects to said animals.

2. A method as in claim 1 in which said directing step comprises providing an elongated member for radiating said energy and positioning said elongated member largely parallel to the surface of said water.

3. A method as in claim 1 in which said radiation includes substantial quantities of visible light.

4. A method as in claim 1 including the step of providing an insect enclosure and attracting said insects towards said enclosure, and using said enclosure to prevent the escape of said insects from the vicinity to the surface of said water.

5. A method as in claim 1 in which said directing step comprises providing a member for radiating said energy, locating said member immediately above the surface of said water, and maximizing the amount of radiation reaching said surface.

6. A method as in claim 1 in which said directing step includes locating an energy radiating member within said water.

7. A method as in claim 1 including the step of enclosing and containing said animals in the vicinity of said radiation.

8. A method as in claim 7 in which said animals are frogs, and including the step of supporting said frogs on a platform in the enclosure for said frogs.

9. A method as in claim 8 including trapping flying insects and feeding them into said enclosure.

10. A method of feeding insects to fish, said method comprising the steps of positioning a foraminous fish enclosure in a body of water, positioning a near ultra-violet radiation source adjacent said enclosure so as to attract insects from said body of water into said enclosure, and stocking said enclosure with fish at a density per unit volume of said enclosure near the crowding limit for said fish whereby the fish catch and eat large numbers of said insects before they escape from said enclosure.

11. A device for feeding insects to aquatic animals, said device comprising means for attracting insects from within the water by directing into said water radiant energy having a wavelength predominantly in the near ultra-violet region and feeding said insects to aquatic animals in said water, and means for maximizing the amount of said radiation penetrating said water.

12. A device as in claim 11 including an elongated radiating member, and in which said maximizing means includes means for mounting said radiating member substantially parallel to the surface of said water.

13. A device as in claim 11 in which said maximizing means includes for mounting a radiating member within said body of water.

14. A device as in claim 11 including a source for said radiant energy, and means for containing said aminals in said water adjacent said source to eat the insects attracted towards said source.

15. A device as in claim 12 in which said radiating member is a circular fluorescent blacklight bulb.

16. A device as in claim 12 in which said radiating member is a linear fluorescent blacklight bulb.

17. A device as in claim 11 including a globular blacklight bulb for producing said radiant energy.

18. A device as in claim 11 in which said maximizing means includes reflector means for reflecting radiant energy from a source into said water.

19. A device as in claim 11 including a source for said energy, housing means forming an insect enclosure, means for supporting said source relative to said enclosure so as to be visible to and attract airborne insects towards said enclosure, a fan for urging into said enclosure airborne insects attracted to said source, and means for retracting said source into said enclosure for operation without said fan.

20. A device as in claim 11 including a source for said energy, housing means forming an insect enclosure, means for supporting said source relative to said enclosure so as to be visible to and attract airborne insects towards said enclosure, a fan for urging into said enclosure airborne insects attracted to said source, said enclosure having a cover with a hole in it, said supporting means including a plate, and at least one support member for supporting said plate on said cover directly above said hole.

21. A device as in claim 11 including a lamp for producing said energy, the projection of said lamp on the surface of said water having an area which is at least a major fraction of the area of the projection of said luminous member on a plane perpendicular to said surface.

22. A device as in claim 21 in which the first-named area is substantially greater than the second-named area.

23. A method of feeding aquatic animals, said method comprising the steps of providing an insect enclosure, floating said insect enclosure on the surface of said water so that said enclosure forms an enclosed airspace above said surface, locating a source of radiation in said airspace, said source producing electromagnetic energy consisting predominantly of energy having a wavelength in the range of 3,000 Angstroms to 4,000 Angstroms, attracting insects from within said body of water towards said enclosure by directing said energy into said water, and using said enclosure to prevent the escape of said insects from the vicinity of the surface of said water.

* * * * *